US007510342B2

(12) United States Patent
Lane et al.

(10) Patent No.: US 7,510,342 B2
(45) Date of Patent: Mar. 31, 2009

(54) WASHABLE KEYBOARD

(75) Inventors: David M. Lane, Sammamish, WA (US); Alana C. Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 11/424,424

(22) Filed: Jun. 15, 2006

(65) Prior Publication Data

US 2007/0292186 A1 Dec. 20, 2007

(51) Int. Cl.
- *G06F 3/023* (2006.01)
- *G06F 3/02* (2006.01)
- *B41J 5/00* (2006.01)

(52) U.S. Cl. .................. 400/472; 200/302.1; 200/302.2
(58) Field of Classification Search ......... 400/472–496; 345/168–172; 200/302.1–302.3, 5 R
See application file for complete search history.

(56) References Cited

U.S. PATENT DOCUMENTS

| | | | | |
|---|---|---|---|---|
| 4,678,880 A | * | 7/1987 | Koizumi et al. | 200/513 |
| 4,948,281 A | * | 8/1990 | Werner | 400/472 |
| 5,175,873 A | * | 12/1992 | Goldenberg et al. | 455/351 |
| 5,180,237 A | | 1/1993 | Chen | |
| 5,193,047 A | * | 3/1993 | Barratt et al. | 361/212 |
| 5,258,592 A | * | 11/1993 | Nishikawa et al. | 200/302.2 |
| 5,367,133 A | | 11/1994 | Schmidt et al. | |
| 5,421,659 A | * | 6/1995 | Liang | 400/472 |
| 5,514,843 A | | 5/1996 | Wilfong | 200/5 R |
| 5,681,122 A | * | 10/1997 | Burke | 400/472 |

(Continued)

OTHER PUBLICATIONS

DongJae Shin, "Performance and Usability of Flexible Membrane Keyboards," Thesis submitted to the faculty of Virginia Polytechnic Institute and State University, Jun. 2005.

(Continued)

*Primary Examiner*—Daniel J Colilla
*Assistant Examiner*—Marissa L Ferguson-Samreth
(74) *Attorney, Agent, or Firm*—Merchant & Gould P.C.

(57) ABSTRACT

A washable switch that may be used in a keyboard is disclosed. In an embodiment, a housing of the keyboard may include a key opening and a support layer may be mounted in the housing. Key silos may be mounted on the support layer and input keys with support legs may be mounted in the key silos. In an embodiment the key silos may comprise an internally lubricated resin. An actuation unit and a keyboard circuitry may be in communication and encapsulated in a first and second barrier layer so as to provide a keyboard that may be safely placed in a dishwasher. If the keyboard is configured for wireless use, a sealable power source compartment sealably coupled to the keyboard circuitry may be provided with a removable door so as to allow the user, in operation, to access and replace a power source. The keyboard may include an externally exposed connector that may be sealed with a plug that may be attached to the housing by a tether.

18 Claims, 8 Drawing Sheets

U.S. PATENT DOCUMENTS

| | | | |
|---|---|---|---|
| 5,952,731 A | 9/1999 | McPherson et al. | |
| 5,969,320 A | 10/1999 | Leeper et al. | |
| 6,459,176 B1 * | 10/2002 | Brockel et al. | 307/150 |
| 6,546,805 B2 * | 4/2003 | Fandrey et al. | 73/753 |
| 6,585,435 B2 | 7/2003 | Fang | |
| 6,644,874 B2 * | 11/2003 | Tsai | 400/490 |
| 6,743,993 B1 * | 6/2004 | Clark et al. | 200/314 |
| 6,747,223 B2 | 6/2004 | Hattori | |
| 7,012,206 B2 | 3/2006 | Oikawa | |
| 7,227,530 B1 * | 6/2007 | Yang | 345/158 |
| 2003/0179540 A1 | 9/2003 | Suda | |
| 2004/0226248 A1 | 11/2004 | Wu | |
| 2006/0060644 A1 | 3/2006 | Pihlaja | |

OTHER PUBLICATIONS

E. Rehmi Post, et al. "Smart Fabric, or Washable Computing," http://web.media.mit.edu/~rehmi/fabric/, Mar. 30, 2006, also appearing in Digest of Papers of the First IEEE International Symposium on Wearable Computers, Oct. 13-14, 1997.

S. F. Defosse, et al. "Development of a Membrane Switch-Type Full-Travel Tactile Keyboard," IBM J. Res. Develop., vol. 29, No. 5, Sep. 1985.

* cited by examiner

WASHABLE KEYBOARD

BACKGROUND

Keyboards are a common interface for entering data and otherwise interacting with a computer. While a number of different designs and shapes exist, one common problem with keyboards is their relative lack of cleanliness. For example, studies have shown that high levels of bacteria can be found on a keyboard. While methods of cleaning keyboards exist, such as wiping the keys with a cloth containing a cleaning solution, care must be used to avoid spilling the cleaning solution into the keyboard and the complexity of keyboards, along with all the cracks and crevices, makes it time consuming to properly clean a keyboard by hand.

In addition, the widespread availability of wireless keyboards, while allowing the user more flexibility, has also tended to expose keyboards to more abusive environments. For example, an individual may spill coffee or soft drinks into a keyboard, potentially causing the life of the keyboard to be significantly reduced. While attempts have been made to improve the resistance of keyboards to abusive environments by improving the spill resistance of keyboards, further improvements would be beneficial.

SUMMARY

In an embodiment, a keyboard housing includes a key opening. A key silo is positioned in the key opening. In an embodiment, the key silo comprises an internally lubricated resin. An input key with a support leg is mounted in the key silo and is configured to be depressed. The depression of the input key closes a circuit in an actuation unit. The actuation unit is enclosed in a barrier layer and in communication with a keyboard circuitry that is configured to transmit a digital signal in response to the input key being depressed. The keyboard circuitry is encapsulated in a barrier layer and in an embodiment the keyboard circuitry may be potted. In an embodiment, the keyboard may be configured to transmit the signal wirelessly and may provide a sealable compartment for storing a power source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which.

DETAILED DESCRIPTION

Computer keyboards, in combination with other input devices such as a mouse or trackball, are widespread and have become an accepted method of interfacing with a computer. However, concerns about the potential spread and even propagation of bacteria and/or viruses has begun to become more prevalent. While such concerns are particular acute in health care settings, general consumers are starting to become more conscious of the potential consequences of not properly cleaning their computer keyboards.

However, as noted above, complicated and time consuming methods of cleaning a keyboard are problematic because the likelihood of a task being done decreases as it complexity and cost in time increases. Therefore, it would be beneficial if a keyboard could be cleaned simply by placing the keyboard into a dishwasher. However, to the extent existing designs might allow this functionality, these designs are generally expensive and therefore have limited appeal to the average user.

Figure 1:
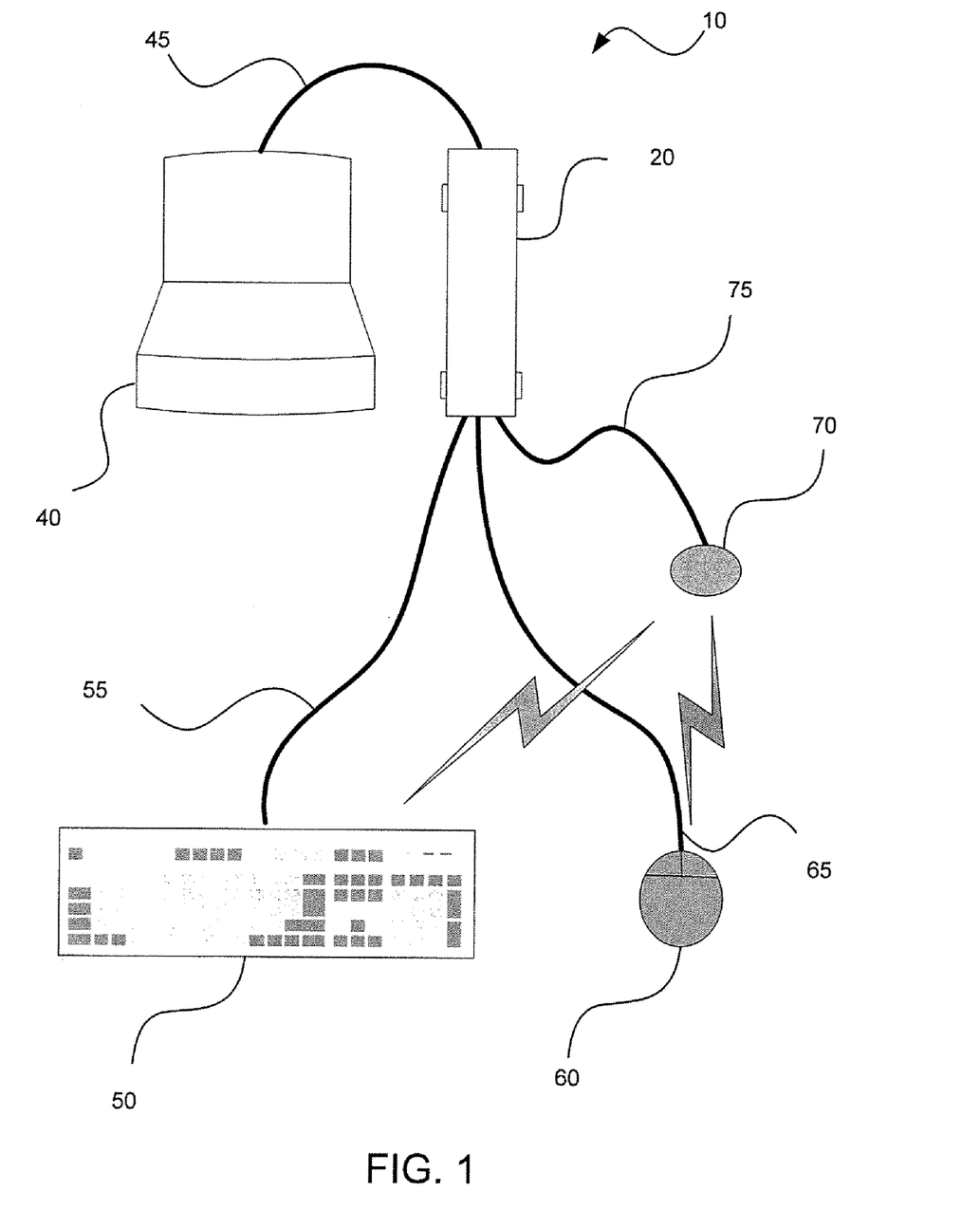
FIG. 1 is a schematic view of an embodiment of computer system.

Looking to FIG. 1, a schematic of an embodiment of a computer system 10 is illustrated. The computer system 10 includes a computer case 20 that may include a processor, a graphics card, memory, a HHD, an optical drive and other known computer components, connected to a display 40 by a cable 45. Of course, the display 40 may be made from a flat-screen technology such as, but not limited to, LCD technology and the display 40 and computer case 20 may also be combined in a single housing or a clam-shell configuration.

A keyboard 50 is shown coupled to the computer case 20 by an optional cable 55. As is known, the keyboard 50 may include a key for each letter of an alphabet as well as additional keys for numbers, functions and the like. A pointer device 60 (depicted as a mouse in FIG. 1) is shown coupled to the computer 20 by an optional cable 65. Other types of pointer devices include track balls, light pens, touch sensitive pads, joysticks and the like. It should be noted that cables 55 and 65, which may be configured for use with Universal Serial Bus (USB) protocol, may be omitted and one or both of the keyboard 50/pointer device 60 may be configured to transmit wireless signals to a receiver 70 that may be coupled to the computer case 20 by a cable 75. Naturally, the keyboard 50 and/or the pointer device 60 may also be in wireless communication directly to the computer case 20 if the computer case 20 includes an appropriate receiver. One possible protocol for communicating signals from the keyboard/input device is Bluetooth. Other protocols for wireless transmission of signals are also suitable such as 802.11x and the like and the choice of the protocol is within the knowledge of a person of skill in the art. To maximize usability of a single wireless configuration of a keyboard 50, as not all computers may be configured to receive the chosen protocol, a combination of a receiver 70 that plugs into the computer case 20 and a keyboard 50 that is configured to transmit wireless signals to the receiver 70 may be provided. In an embodiment, a set may include the keyboard 50, the receiver 70 and the pointer device 60.

Figure 2A:
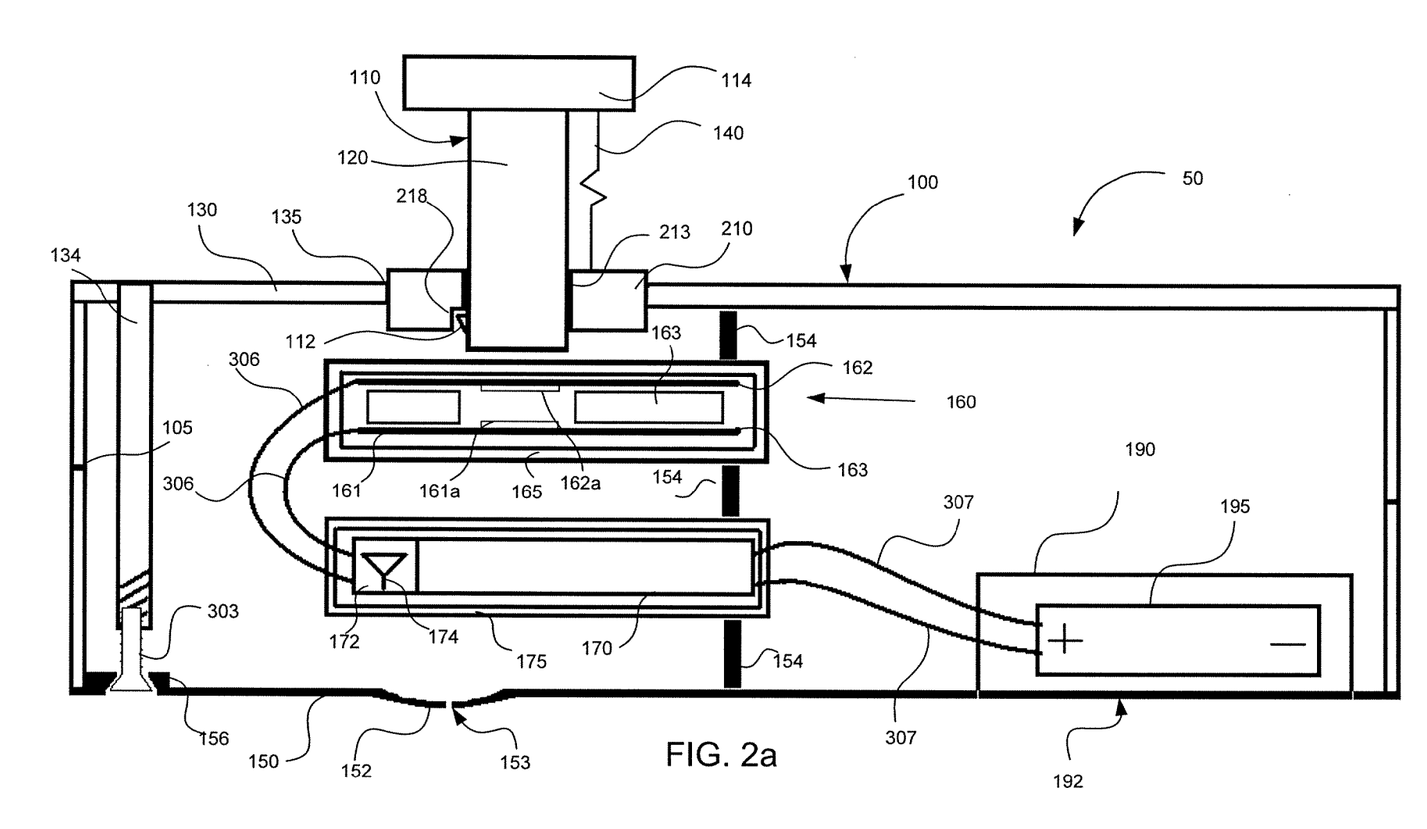
FIGS. 2a and 2b are schematic views of embodiments of a keyboard.
Figure 2B:
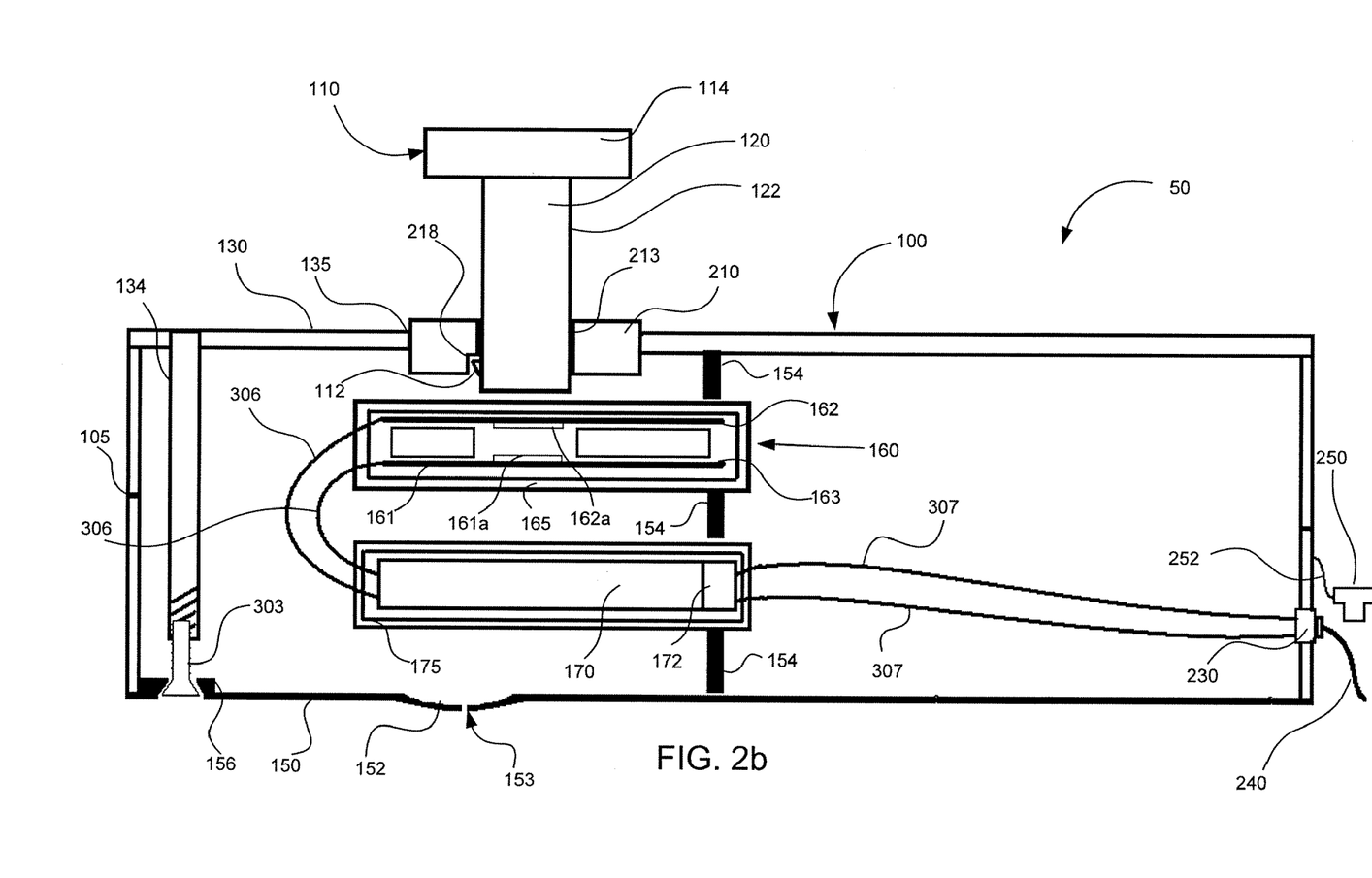

FIGS. 2a and 2b illustrate schematics of two embodiments of configurations that may be used in the keyboard 50. The input key 110 includes a top cap 114 and a support leg 120 with an outer surface 122 that is mounted in a key silo 210. The key silo 210 includes an inner surface 213 that is configured to slide against the outer surface 122 of the support leg 120 and guide movement of the input key 110 along an axis.

As depicted, the key silo 210 is mounted directly to the key opening 135 in the upper portion 130 of the housing. However, in an alternative embodiment the key opening 135 may be larger than the key silo 210 and a support layer 180 (FIG. 4) may be positioned below the upper portion 130 so as to support the key silo 210.

The input key 10 may include a detent 112 that engages a recess 218 in the key silo 210 so as to prevent accidental removal of the input key 110. Depending on the tolerances and clearances desired, more than one detent and associated recess may be useful to help retain the input key 110 in the depicted installed position. To bias the input key 110 in an initial position, a biasing element 140 may be provided. While depicted as a spring extending between a bottom of the top cap 114 and a top of key silo 210, the depicted biasing element 140 is merely representative of one possible biasing element configuration and any other desired biasing element may be used.

As depicted, the actuation unit 160 has a membrane construction and is encapsulated in a first barrier layer 165. The membrane includes a first layer 161 with a contact 161a and a second layer 162 with a contact 162a that is separated by a spacer layer 163. The actuation unit 160 is coupled to a keyboard circuitry 170 via wires 306 so as to transmit power and signals. The wires 306 have a waterproof coating and extend through the first barrier layer 165 and are sealed to the barrier layer 165 through a known process such as the use of an adhesive or a pressed fit or other known methods as desired. It should be noted that the barrier layer 165 may be made of any desirable material such as silicone and edges of the barrier layer 165 may be joined in known manufacturing processes such as RF welding or heat staking. The wires 306 couple the actuation unit 160 to a keyboard circuitry 170 that is encapsulated in a second barrier layer 175 which may be a heat shrink plastic or an epoxy or urethane coating (e.g. the keyboard circuitry may be potted), thus the wires 306 are also sealed to the second barrier 175. In an embodiment, the keyboard circuitry 170 may be configured for wireless transmission of data by including a communication interface 172 that includes an antenna 175. The keyboard circuitry 170, if configured for wireless communication, may be coupled by wires 307 to a sealable power source compartment 190 that may include a power source 195. As can be appreciated, the wires 307 include a waterproof coating and are sealably coupled to both the keyboard circuitry 170 and the sealable power source compartment 190.

It should be noted that in an embodiment the sealable power source compartment 190 may include a door 192 that is removably mounted in a sealed manner to the sealable power source compartment 190. To provide the seal around the door 192, one or more gaskets such as o-rings may be used. Such an embodiment provides the advantage of allowing a user to access the sealable power source compartment 190 and replace a power source 195 that may be positioned inside. Thus, the sealable power source compartment is an example of a potential power source. It should be noted that the sealable power source compartment may be configured for any desired type of power source 195, such as without limitation, one or more batteries (whether or not they are rechargeable), ultra capacitors and/or fuel cells. In an alternative embodiment, the sealable power source compartment 190 may sealed and omit the door 192 and a recharge able power source 195 may be positioned within the sealable power source compartment. This embodiment provides the advantage of ensuring the sealable power source compartment remains sealed.

Both the actuation unit 160 and the keyboard circuitry 170 may be supported and held in position by one or more supports 154, the current depiction being simplified for the purpose of clarity. Thus, as depicted the actuation unit 160 is positioned so as to overlay the keyboard circuitry 170.

As depicted, the housing 100 of the keyboard 50 may include a junction 105 between the upper portion 130 and a lower portion 150. To hold the upper and lower portions together, known fastening techniques may be used. In an embodiment a member 134 may extend from the upper portion 130 and be configured to be engaged by a fastener 303 positioned in a recessed boss 156 provided in the lower portion 150, however any other desirable fastening technique may be used. It should be noted that while one fastening point is shown, additional fastening points may be provided. As can be appreciated, however, the fact that the actuation unit, the keyboard circuitry and the potential power source are sealed negates the need to seal the remainder of the keyboard. Therefore, in an embodiment water can be used to wash the keyboard and may be allowed to enter into the housing 100. As can be appreciated, any desirable material may be selected for the components of the keyboard 50. In an embodiment, the materials may be selected so that the keyboard 50 is configured withstand the elevated temperatures experienced in a dishwasher.

It should be noted that if the keyboard 50 is configured to be dishwasher safe, in an embodiment one or more drain holes 153 may be provided so that water that enters the housing 100 can readily drain out once the keyboard 50 is washed. The drain hole 153 may be positioned in a depression 152 so as to aid the drainage of water from the keyboard 50. While the schematic shows a single drain hole 152 positioned in a more centrally located depression 153 in the lower housing 150, multiple drain holes may be provided and the one or more drain holes may be positioned in corners or edges of the keyboard 50 so as to further facilitate drainage. In addition, one or more of the drain holes may include a plug (not shown) that may be tethered to the housing 100 in a manner similar to the plug 250, as will be discussed below.

While the keyboard circuitry 170 and actuation unit 160 and the potential power source are sealed so as to protected against damage caused by water entering the keyboard, one potential issue is that the washing of the keyboard 50 in a dishwasher will tend to remove any lubrication provided on the surface of either the key silo 210 or the support leg 120 of the input 110. In operation the outer surface 122 of the support leg 120 will slide against the key silo 210 and therefore the lubrication helps provide a more consistent feel. Thus, the feel of depressing the input key 110 may be less acceptable to certain users after an initial washing. In an embodiment, the key silo 210 may be made of an internally lubricated resin. As can be appreciated, such an embodiment is resistant to the loss of lubrication that would otherwise result if the keyboard 50 was cycled through a dishwasher and therefore has the advantage of providing a lubricated surface 213 on the key silo 210 even after the keyboard 50 is subjected to a dishwasher cycle. In an alternative embodiment, the input key may be made of two parts, the support leg 120 made of an internally lubricated resin and the key top 114 made of a non-internally lubricated resin. As can be appreciated, an advantage of this configuration is that the key top 114 is easier to label by painting or by pad printing if it is not made of an internally lubricated resin. In an embodiment, the key silo 210 may be made of an internally lubricated resin and the input key 110 may be formed of a single piece of material that is not an internally lubricated resin.

While FIG. 2a depicts an embodiment of a wireless configuration, FIG. 2b illustrates an embodiment of a wired configuration of a keyboard. The keyboard circuitry 170 is coupled to wires 307. As noted, the wires include a waterproof coating and are sealing coupled to the keyboard circuitry and are also sealing coupled to a cable connector 230 that extends through the housing 100 and provides an access point for connecting a cable 240. In an embodiment the cable connector 230 may be sealed from exposure to water on the inside of the housing 100 and may be a USB connector that transmit signals and provides power. However, the cable connector 230 is potentially exposed to water on the exterior side of the housing 100 and the construction used for a typical cable connector 230 would be susceptible to water damaged if the cable connector 230 was exposed to a dishwasher cycle. Therefore, in an embodiment, a plug 250 may be provided for insertion in the cable connector 230. The plug 250 may be made of any desirable material, including a pliable plastic-like material, which is configured to seal the cable connector 230 when the plug 250 is installed. While the plug 250 need not be fastened to the keyboard 50, and may be fastened to the keyboard by a clip (not shown) that is provided on the underside of the keyboard housing 100, in an embodiment the plug 250 may include a tether 252 that secures the plug 250 to the housing 100 when the plug 250 is not in use. The tether 252 may be fastened to the housing 100 in a known manner such as through the use of adhesives or other desirable means and the tether 252 may be coupled to the plug 250 through known methods such as overmolding, adhesives and the like.

Figure 3:
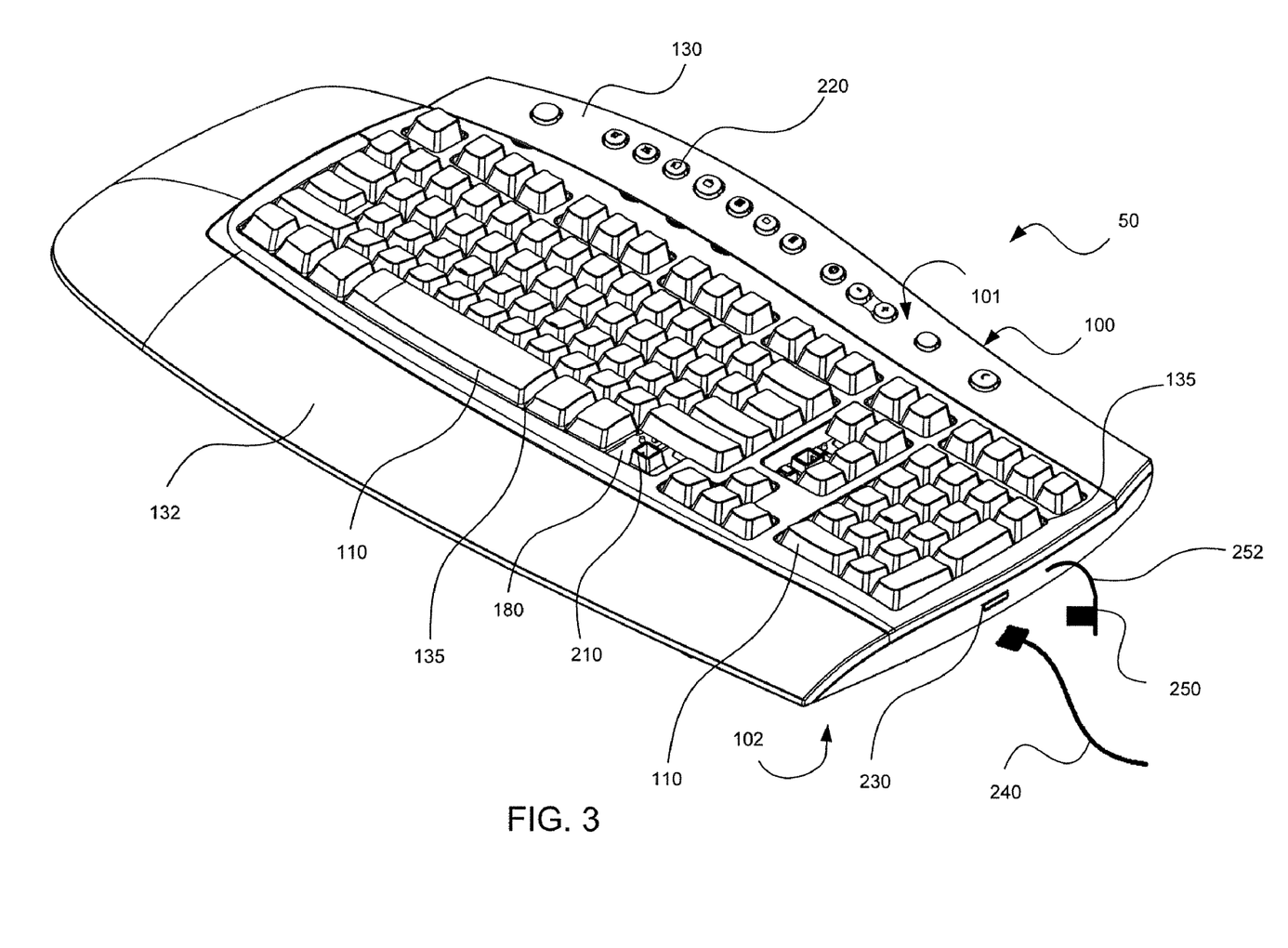
FIG. 3 is an isometric view of an embodiment of a computer keyboard.

Turning next to FIG. 3, an embodiment of a keyboard 50 is depicted. The keyboard 50 includes a housing 100 that may include an upper portion 130 on a first side 101, a padded wrist support 132, and a plurality of key opening 135. A plurality of input keys 110 are depicted as being positioned in several of the key openings 135. In an embodiment, a first set of input keys in a first key opening include labels for the letters of the alphabet and a second set of input keys in a second key opening including numeric labels. Other keys with other labels may be added as desired. As can be appreciated, two input keys have been removed and a key silo 210 is shown supported by a support layer 180. In additional to the input keys 110, one or more buttons 220 may be provided. As will be discussed below, the buttons 220 may be mounted in a different manner than the input keys.

The keyboard 50 may further includes the cable connecter 230 (which may be a USB compatible design if desired) configured to accept a mating connector from the removable cable 240. Thus, the cable connector 230 is an example of a potential power source. In addition, the connector plug 250 is shown coupled to housing 100 by the tether 252. As noted above, similar plugs may be provided for additional drain holes and these similar plugs may also be tethered to the keyboard housing 100. It should be noted that if the keyboard 50 is configured to transmit signals in a wireless manner, the cable connector 230 may be omitted. In an embodiment, however, the keyboard 50 may be wireless and may also include a one or more externally exposed connectors that may be similar to the cable connector 230.

Figure 4:
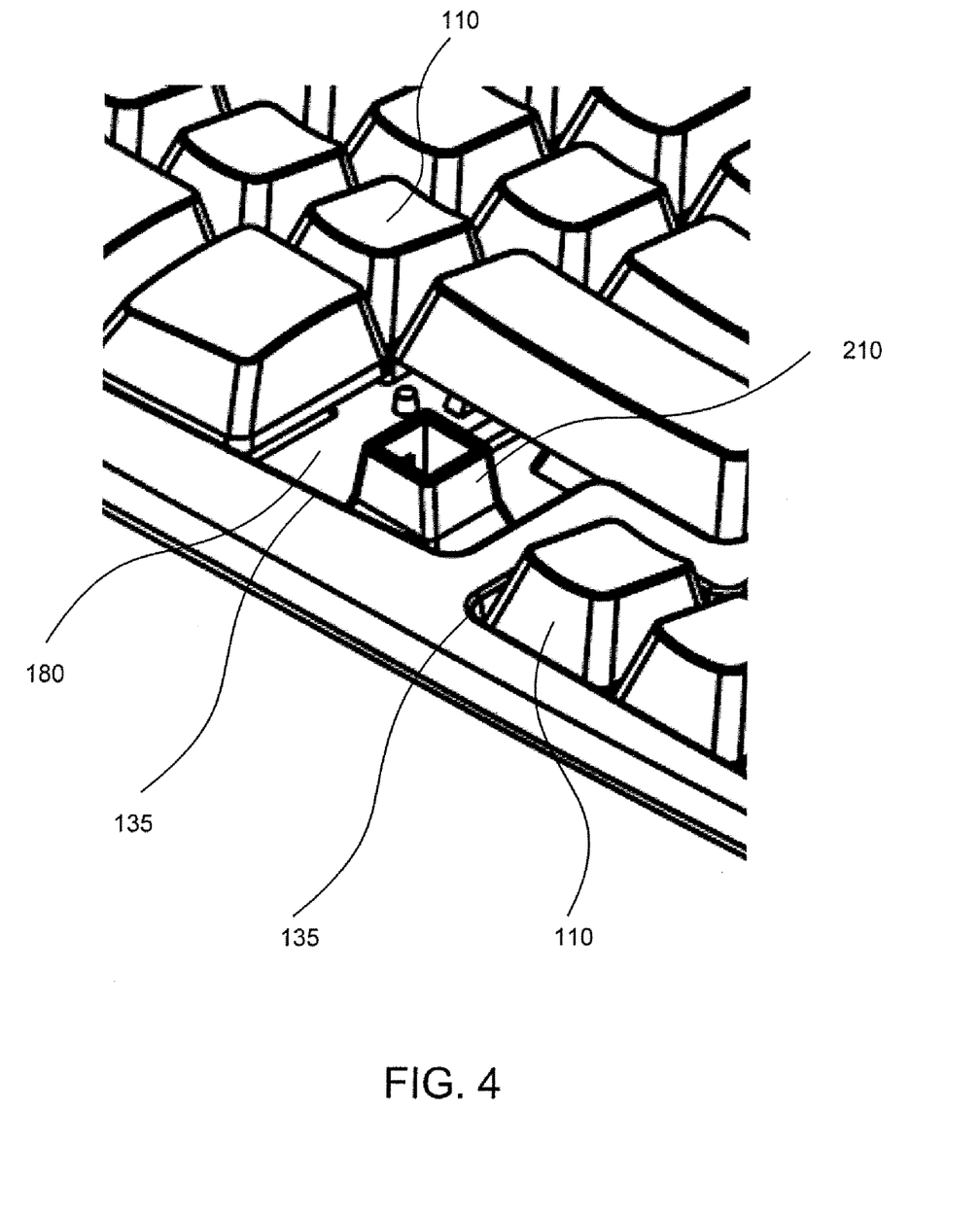
FIG. 4 is an enlarged isometric view of a portion of the computer keyboard shown in FIG. 3.

Looking next at FIG. 4, an enlarged view of a portion of the keyboard 50 depicted in FIG. 3 is illustrated. As can be appreciated, the key silo 210 is supported by the support layer 180. The support layer 180 may be mounted to the housing 100 below the upper portion 130 of the housing 100 and may span the key opening 135 and a single support layer may also span more than one key opening 135. In an embodiment, each of the input keys 110 positioned in a particular key opening 135 may be supported by respective key silos 210 that are mounted in apertures (not shown) in the support layer 180. The apertures are may be configured so as to allow the key silos 210 to nest in and be supported by the support layer 180.

Figure 5:
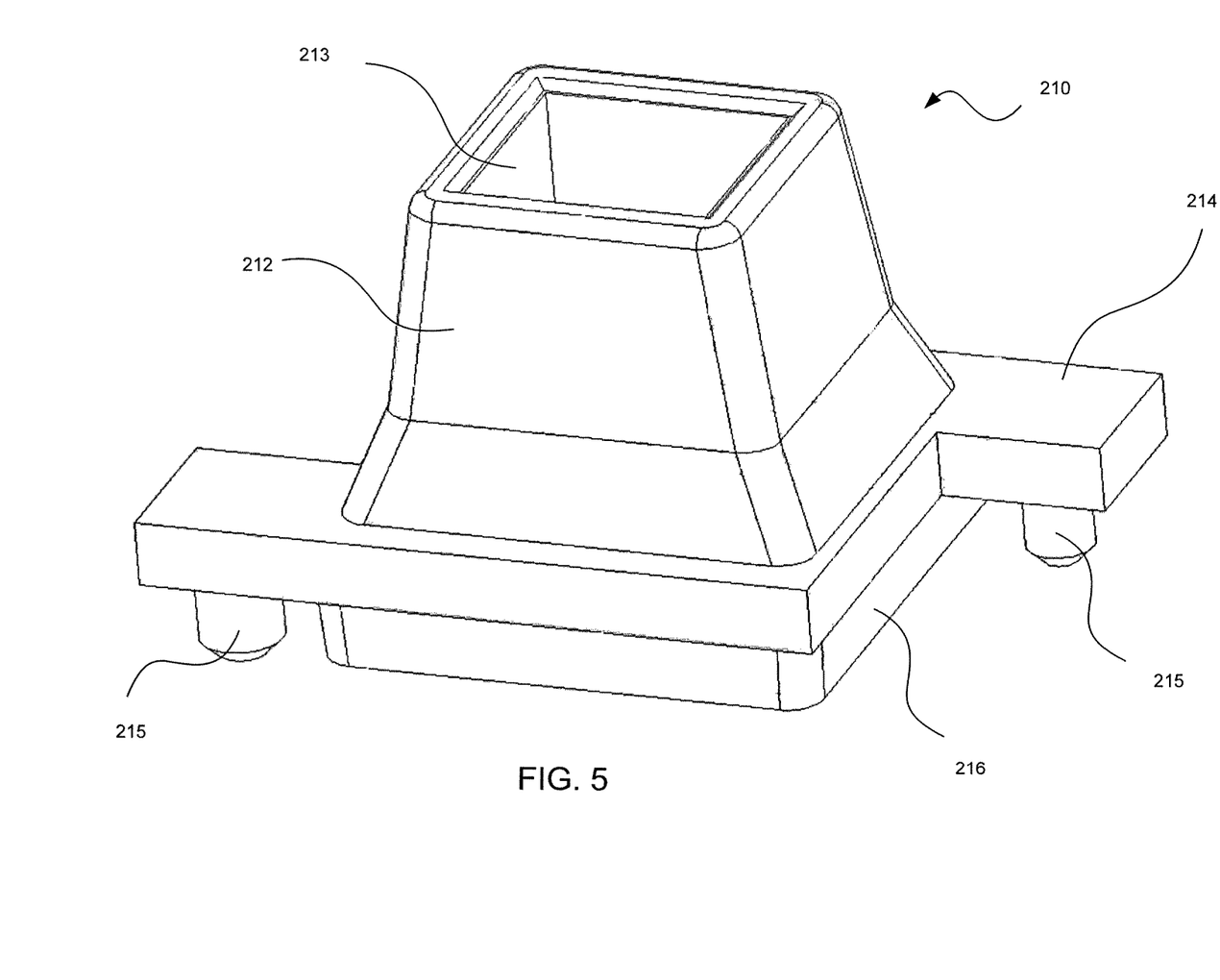
FIG. 5 is an isometric view of an embodiment of a key silo.
Figure 6:
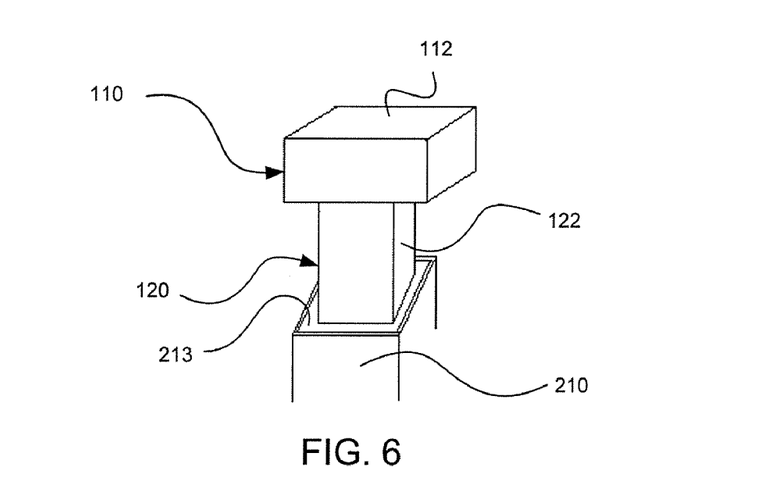
FIG. 6 is a schematic view of an input key and key silo.

FIG. 5 illustrates an isometric view of an embodiment of a key silo 210. As depicted, the key silo 210 includes an upward extend projection 212 with an inner surface 213 extending through the key silo 210 so as to provide a passage way for a support leg 120 of an input key 110. The support leg 120 may be inserted into the key silo so that the out surface 122 slides against the inner surface 213. To aid in the placement and securing of the key silo 210 to a support surface, one or more arms 214 with pins 215 may be provided so that the key silo 210 is indexed and its orientation, when installed, is controlled. As a further aid to controlling the position of the installed key silo 210, a shoulder 216 may be configured so as to allow the key silo 210 to nest an opening in the support layer 180. As can be appreciated, the shoulder 216 may be configured so as to be non-symmetrical so that the shoulder 216 is sufficient to align the key silo 210. The shoulder 216 may further include a detent (not shown) so as to allow the key silo 210 to be snapped into position. As previously noted, the key silo 210 may be formed of an internally lubricated resin. While numerous internally lubricated resins exist and the selection of one largely depends on the processes used to manufacture the keyboard, it should be noted that a resin suitable for withstanding the elevated temperatures of a dishwasher cycle may be desired if the keyboard is going to be dishwasher safe.

Figure 7:
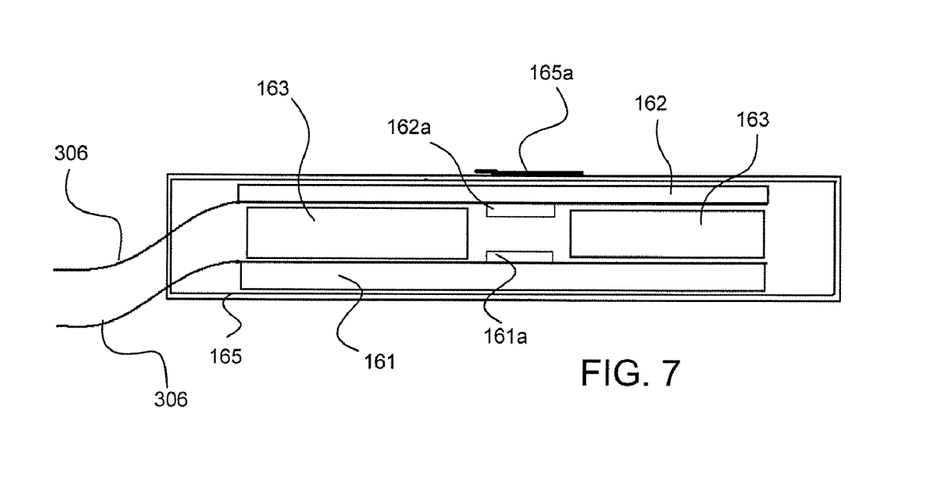
FIG. 7 is a schematic cross-section view of an embodiment of an actuation unit.

The actuation unit 160 is encapsulated in barrier layer 165, which may be one or more pieces of silicone RF welded or staked together. In an embodiment the method of forming the barrier layer 165 will provide a seal between the barrier layer and the leads that extend through the barrier layer 165. It should be noted that while the barrier layer 165 may be made of silicone, any suitable material that is sufficiently water impermeable and flexible enough to suit the intended purpose of the barrier layer 165 may also be used.

It should be noted that if silicone is used as the material for the barrier layer 165, a wear plate 165a may be provided so that the barrier layer 165 is less likely to be worn through by repeated pressing of the input key 110. Such a wear plate 165a, if provided, could be mounted to the barrier layer 165 through an over-molding process or with an adhesive or through some other suitable method of attachment. In operation, pressing down on the optional wear plate 165a causes the contacts 161a, 162a to be pressed together so they touch and an electrical connection is made. In an embodiment this can be accomplished by compressing the spacer layer 163. Once the contacts 161a, 162a touch, the change is the electrical circuit is sensed and a digital signal may be sent that is representative of the input key 110 being depressed/translated.

When the contacts 161a, 162a are made to touch because of the translation of the input key 110, the keyboard circuitry 170 senses the change in the circuit and transmits a digital signal indicating that the input key 110 has been pressed. The keyboard circuitry 170 typically is provided on a PCB and includes a controller but as the design of a keyboard circuitry is known, as evidence by the widespread use of keyboards, for the sake of brevity most details of the keyboard circuitry will be omitted.

As is known, the keyboard circuitry 170 includes a communication interface 172. In the case of a wired design, the interface 172 is configured to send data over wires 307 so as to provide a digital signal representing the fact that a particular input key 110 was translated/depressed. While numerous protocols exist and may be used, as noted above, a common protocol for communicating the signal is the USB protocol because the USB protocol also allows power to be provided over the same cable that is being used to send the signal. If, however, the keyboard 50 is configured to transmit the digital signal in a wireless manner, the communication interface 170 may convert the digital signal into an appropriate protocol and transmit the signal via the antenna 174 (if a RF type medium is used). If an optical medium is used to transmit the signal, the antenna may be replaced with a light emitting diode or a laser as is appropriate.

Figure 8:
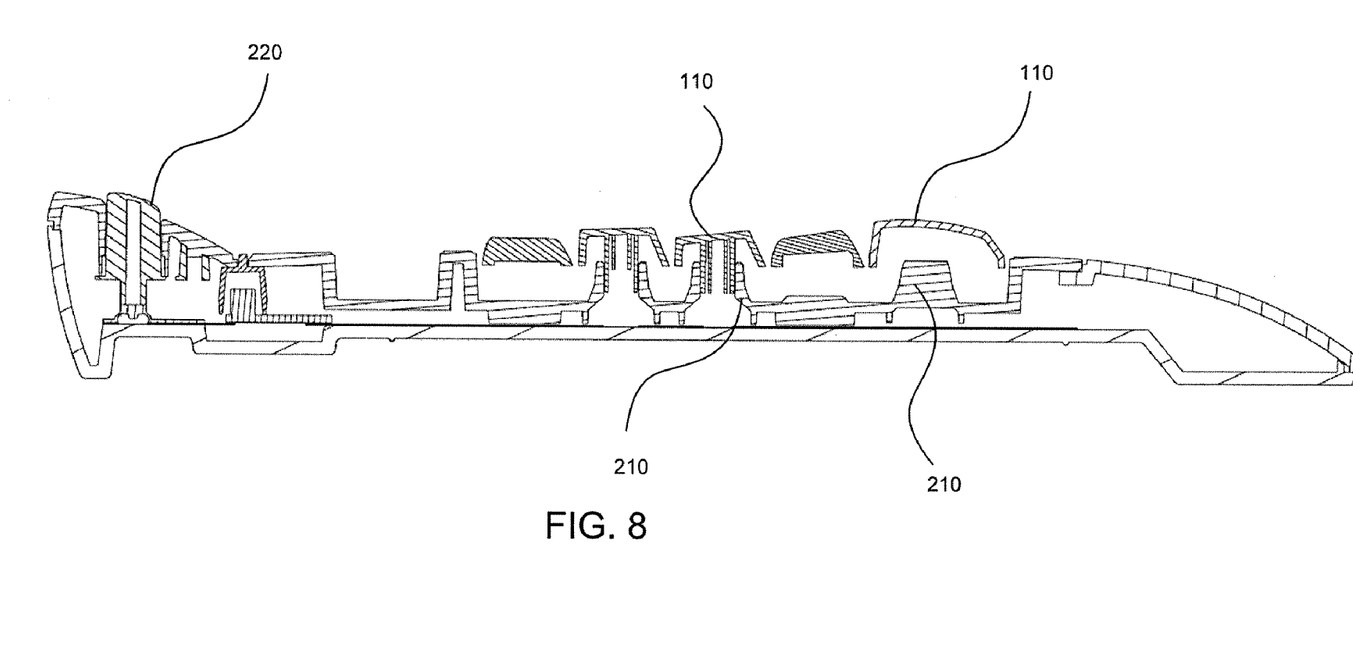
FIG. 8 is a simplified cross-section view with portions removed of the keyboard depicted in FIG. 3.

FIG. 8 illustrates a cross-section of the keyboard 50 depicted in FIG. 3. As can be appreciated, the button 220 mounts to the housing 100 in a manner that is different than how the input keys 10 are mounted. Thus, the button 220 is not mounted in a key silo 210. Accordingly, while it is preferred to mount the support legs 120 of the input keys 110 in the key silos 210 for at least the input keys corresponding to the alphabet and the numerals, other methods may also be used in combination.

It should be noted that additional configurations are possible. For example, the biasing element 140 discussed above may be molded into the barrier layer 165. In addition, it should be noted that that the keyboard circuitry 170 may include more than one separate PCB or component in communication with other separate PCB/components portions of the keyboard circuitry 170 and each portion may be enclosed in a separate barrier layer 175 (e.g., the keyboard circuitry 170 may be a combination of components, each with a separate barrier layer 175, each in communication with another). Thus, as depicted, the portions of the keyboard 50 that could be harmed by immersion in a liquid are protected. Thus, water may be allowed to enter the keyboard 50 through the key opening 135 without having a substantial effect on the expected life cycle of the keyboard 50. Therefore, in an embodiment using materials configured to withstand the dishwasher cycle, a keyboard 50 may be placed in a dishwasher and safely cleaned. It should be noted that when placing a keyboard 50 into a dishwasher, the removable cable 240, if provided, may be removed so as to prevent the wrapping of the cable in the washing mechanism or otherwise damaging the cable. In such a configuration, the connector plug 250 may be placed in the cable connector 230 so as to prevent water damage to the cable connector 230. Thus, the inclusion of the connector plug 250 coupled to the housing 100 by the tether 252 allows the connector plug 250 to provide a visual reminder that the cable connector should be sealed before the keyboard 50 is washed. In an embodiment, a plurality of cable connectors may be provided and each cable connector may be associated with a corresponding tethered plug.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A washable switch, comprising:
   a housing having a key opening;
   a key silo positioned in the key opening;
   an input key including a support leg and mounted in the key silo and configured to be depressed, wherein one of the key silo and the support leg comprises an internally lubricated resin;
   an actuation unit positioned in the housing and configured to provide a closed circuit in response to the depression of the input key, the actuation unit encapsulated in a first barrier layer; and
   a switch circuitry encapsulated in a second barrier layer and positioned in the housing and in sealed communication with the actuation unit and a potential power source, the switch circuitry configured to translate the closed circuit into a digital signal, wherein the switch circuitry encapsulated in the second barrier layer comprises shrink tubing.

2. The washable switch of claim 1, further comprising a support layer positioned in the housing and configured to support the key silo.

3. The washable switch of claim 2, wherein the key silo is indexed so as to control orientation of the key silo when mounted to the support layer.

4. The washable switch of claim 3, wherein the key silo comprises the internally lubricated resin.

5. The washable switch of claim 1, further comprising:
   an external connector sealably coupled to the switch circuitry; and
   a plug for sealing the external connector.

6. The washable switch of claim 5, further comprising a tether with a first end coupled to the plug and a second end coupled to the housing.

7. The washable switch of claim 1, further comprising a sealed compartment for holding the power source, the compartment including a removeable door configured to allow sealable access to the power source, wherein the switch circuitry is configured to wirelessly communicate the digital signal.

8. A keyboard for use in a computer system, comprising:
   a housing comprising a key opening;
   a support layer positioned in the housing;
   a plurality of key silos positioned in the key opening and mounted on the support layer;
   a plurality of input keys configured to be translated, each including a support leg mounted in one of the plurality of key silos, wherein for each of the plurality of input keys one of the key silo and the support leg comprises an internally lubricated resin;
   an encapsulated actuation unit positioned in the housing and configured to provide a plurality of closed circuits in response to translation of respective input keys, wherein the encapsulated actuation unit comprises a three layer membrane surrounded by a silicone barrier layer; and
   an encapsulated keyboard circuitry in communication with the actuation unit, the keyboard circuitry configured to translate the respective closed circuits into digital signals.

9. The keyboard of claim 8, wherein the encapsulated keyboard circuitry is potted.

10. The keyboard of claim 8, wherein silicone barrier layer comprises a plurality of wear plates aligned with the support legs of the plurality of input keys.

11. The keyboard of claim 8, wherein the plurality of key silos comprise the internally lubricated resin.

12. The keyboard of claim 8, further comprising a cable connector configured to accept a removable cable and a plug configured to seal the cable connector.

13. The keyboard of claim 8, wherein the keyboard circuitry includes a wireless interface and further comprises a sealable power source compartment in electrical connection with the encapsulated keyboard circuitry, the power source compartment comprising a door configured to removably seal the power source compartment when installed, whereby a user, in operation, may remove the door and replace a power source positioned in the power source compartment.

14. A computer keyboard system, comprising:
- a housing comprising an upper surface a key opening and a drain hole;
- a support layer positioned in the key opening;
- a plurality of indexed key silos mounted on the support layer;
- a plurality of depressible input keys respectively positioned in the plurality of indexed key silos;
- an actuation unit configured to provide a plurality of closed circuits in response to a depression of the plurality of depressible input keys, the actuation unit encapsulated in a first barrier layer, wherein the first barrier layer is silicone; and
- an encapsulated keyboard circuitry in communication with the actuation unit, the keyboard circuitry configured to provide a digital signal in response to respective depression of one of the plurality of input keys, wherein the encapsulated keyboard circuitry is enclosed in a second barrier layer comprising shrink tubing.

15. The system of claim 14, further comprising a power source compartment in sealed communication with the keyboard circuitry, the power source compartment comprising a door that is sealably mountable to the power source compartment, wherein the keyboard circuitry is configured for wireless communication.

16. The system of claim 15, further comprising a receiver configured to receive wireless signals from the keyboard circuitry, the receiver configured to be coupled to a computer.

17. The system of claim 14, wherein the housing comprises a recessed area and the drain hole is positioned in the recessed area.

18. The system of claim 14, wherein the plurality of key silos comprise an internally lubricated resin.

* * * * *